(12) United States Patent
Oriani et al.

(10) Patent No.: US 9,803,073 B2
(45) Date of Patent: *Oct. 31, 2017

(54) HEAT RESISTANT ETHYLENE VINYL ACETATE COPOLYMER COMPOSITION AND PROCESS FOR ITS PRODUCTION

(71) Applicant: E. I. DU PONT DE NEMOURS AND COMPANY, Wilmington, DE (US)

(72) Inventors: Steven R Oriani, Landenberg, PA (US); Mark Aaron Stewart, Wilmington, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,442

(22) Filed: Mar. 3, 2016

(65) Prior Publication Data

US 2016/0185943 A1    Jun. 30, 2016

Related U.S. Application Data

(63) Continuation of application No. 14/085,049, filed on Nov. 20, 2013, now abandoned.

(51) Int. Cl.
| | | |
|---|---|---|
| *C08L 23/08* | (2006.01) | |
| *C08L 31/04* | (2006.01) | |
| *C08L 77/00* | (2006.01) | |
| *C08J 3/00* | (2006.01) | |
| *C08J 3/24* | (2006.01) | |

(52) U.S. Cl.
CPC .......... *C08L 23/0853* (2013.01); *C08J 3/005* (2013.01); *C08J 3/24* (2013.01); *C08L 31/04* (2013.01); *C08J 2323/08* (2013.01); *C08J 2331/04* (2013.01); *C08J 2477/00* (2013.01); *C08L 2312/00* (2013.01); *Y10T 428/139* (2015.01)

(58) Field of Classification Search
None
See application file for complete search history.

(56) References Cited

U.S. PATENT DOCUMENTS

| | | | |
|---|---|---|---|
| 4,174,358 A | | 11/1979 | Epstein |
| 4,348,502 A | * | 9/1982 | Coran ............ C08L 23/0853 524/87 |
| 5,948,503 A | | 9/1999 | Yamamoto et al. |
| 7,608,216 B2 | | 10/2009 | Park et al. |
| 7,691,943 B2 | | 4/2010 | Hoffmann et al. |
| 9,062,193 B2 | * | 6/2015 | Oriani ............ C08L 23/0853 |
| 9,068,066 B2 | * | 6/2015 | Oriani ............ C08L 23/16 |
| 2006/0100368 A1 | | 5/2006 | Park |
| 2009/0247690 A1 | | 10/2009 | Varnhorn et al. |

FOREIGN PATENT DOCUMENTS

| | | |
|---|---|---|
| EP | 1081188 A1 | 7/2001 |
| EP | 2098566 A1 | 9/2009 |
| WO | 2014/042943 A1 | 3/2014 |
| WO | 2014/089136 A1 | 6/2014 |

OTHER PUBLICATIONS

Yu et al., "Effect of EVM/EVA-g-MAH Ratio on the Structure and Properties of Nylon 1010 Blends", Journal of Polymer Science: Part B: Polymer Physics, vol. 47, 877-887 (2009).
Levapren® Ethylene Vinyl Acetate (EVM) literature LXS-KA017e, Edition 2010-10, Jan. 2012.
PCT International Search Report and Written Opinion for International Application No. PCT/US2013/072988 dated Aug. 27, 2014.

* cited by examiner

*Primary Examiner* — Ana Woodward

(57) ABSTRACT

Disclosed herein are curable heat resistant ethylene vinyl acetate copolymer-polyamide blend compositions, wherein the ethylene vinyl acetate copolymer has a melting peak temperature of 100° C. or less. The blend compositions comprise 0.1 to 10 weight percent dispersed polyamide, and may be cured to form articles having improved heat resistance while maintaining the desirable physical properties of unmodified, cured ethylene vinyl acetate articles.

19 Claims, No Drawings

HEAT RESISTANT ETHYLENE VINYL ACETATE COPOLYMER COMPOSITION AND PROCESS FOR ITS PRODUCTION

CROSS-REFERENCE TO RELATED APPLICATION

This application claims priority under 35 U.S.C. §120 as a continuation of U.S. patent application Ser. No. 14/085,049, filed on Nov. 20, 2013, which is incorporated herein by reference in its entirety.

FIELD OF THE INVENTION

The present invention is directed to a peroxide curable ethylene vinyl acetate copolymer composition, a process for producing a thermoset ethylene vinyl acetate elastomer composition having enhanced heat-resistance and to articles formed from the thermoset elastomer composition.

BACKGROUND OF THE INVENTION

Ethylene vinyl acetate (EVA) copolymers are well-known synthetic materials formed by copolymerizing ethylene and vinyl acetate. EVA copolymers may be crosslinked by free radial generators such as peroxides, azides, or high energy radiation to form elastomeric or flexible articles, depending on the vinyl acetate content. As disclosed in "Levapren® Ethylene Vinyl Acetate (EVM)" literature LXS-KA 017e, 2010-10, 01/2012, EVA copolymer crystallinity and melting point increase with decreasing vinyl acetate content. When the vinyl acetate content is sufficiently low that the melting peak temperature of the EVA copolymer exceeds about 100° C., the EVA copolymer becomes difficult to mix with peroxide without causing scorch or (i.e., premature curing), and if successful, the high crystallinity results in a stiff and inelastic cured article. Therefore, the EVA copolymers useful in this invention have a melting peak temperature less than about 100° C. The ethylene vinyl acetate (EVA) copolymers may contain only copolymerized ethylene units and vinyl acetate units or may comprise copolymerized ethylene units, vinyl acetate units, and additional copolymerized monomers, for example esters of unsaturated carboxylic acids, such as methyl acrylate or butyl acrylate. Examples of commercially available EVA copolymers suitable for use in this invention include certain Elvax® resin products from E. I. du Pont de Nemours and Company and Levapren® products from Lanxess Corp.

In view of their low cost compared to other flexible or elastic polymers, EVA copolymers are widely used in the manufacture of wire and cable jacketing as well as in the production of automotive parts such as hoses and seals.

Resistance to heat aging is a particularly desirable property in rubber parts that are used in under the hood automotive applications, e.g. hoses, gaskets, and seals. Because such parts may be exposed to temperatures in excess of 175° C. for periods of several hours on a regular basis, degradation of physical properties through oxidative embrittlement can occur. In cured ethylene vinyl acetate (EVA) articles, this often results in a reduction in extensibility and an increase in hardness and modulus of the rubber article. Such effects are disclosed for example in EP1081188. Methods to enhance heat resistance, specifically hot air aging resistance, of EVA articles have involved attempts to identify more effective antioxidant systems. However, there is still a need to improve the heat or hot air aging resistance of these copolymers.

It has now been found that it is possible to produce cured EVA articles that exhibit excellent heat aging resistance by dispersing small amounts of polyamide (up to 10 wt %) in the EVA copolymer.

A number of EVA copolymer-polyamide blend compositions have been disclosed in the prior art. For example, it is known to add uncured EVA copolymers (i.e. gums) to polyamides to form toughened thermoplastic compositions. U.S. Pat. No. 4,174,358 exemplifies the use of uncured EVA copolymers at levels up to 20 wt % as toughening additives for polyamides. A compatibilizer such as a maleic anhydride grafted EVA copolymer may also be included in the EVA copolymer-polyamide blend, as disclosed in J. *Polymer Science: Part B: Polymer Physics*, Vol. 47, 877-887 (2009). The polyamide component in these compositions comprises the continuous polymer matrix and the uncured EVA copolymer is a minor additive. When polyamide comprises the continuous phase in the blend the composition generally cannot be processed at temperatures below the melting temperature of the polyamide, or can be processed only with great difficulty at such temperatures.

It is also known to form thermoplastic elastomer compositions comprising EVA copolymer and polyamide. For example, U.S. Pat. No. 5,948,503 discloses compositions comprising an uncured elastic polymer, a polyamide in the form of fine fibers, and a polyolefin having a melting temperature from 80° C. to 250° C. In addition, certain vulcanized compositions are disclosed therein.

Thermoplastic vulcanizates comprising EVA and polyamide, in which the EVA copolymer is dynamically crosslinked (i.e., crosslinked under shear mixing to create a dispersion of elastomer particles in a continuous phase of another polymer) are also known. Such compositions are disclosed in EP2098566, and may be improved by the use of a coupling agent such as maleic anhydride grafted EVA copolymer as disclosed in U.S. Pat. No. 7,691,943.

U.S. Pat. No. 7,608,216 and U.S. Patent Application Publication 2006/0100368 disclose compositions prepared by admixing an uncured elastomer, for example an EVA copolymer, with a thermoplastic polymer or another uncured (gum) elastomer. Techniques such as fractional curing, partial dynamic vulcanization, or the use of high performance reinforcing fillers are disclosed to increase the green strength of the uncured or partially cured compound. The admixed compositions may be subsequently crosslinked with a curing agent for the elastomer component.

It has now been found that when EVA copolymers having a melting peak temperature of about 100° C. or less additionally comprise about 0.1 wt % to 10 wt % polyamide based on the total weights of EVA copolymer and polyamide in the blend, the resultant compositions, when cured by a free radical generator, exhibit enhanced resistance to physical property loss during hot air aging. In addition, such compositions maintain similar Shore A hardness, tensile strength, tensile elongation to break, and other physical properties of the unmodified cured EVA article.

SUMMARY OF THE INVENTION

Disclosed herein is heat resistant curable ethylene vinyl acetate (EVA) copolymer-polyamide blend composition comprising: (A) from about 99.9 wt % to about 90 wt % of an EVA component selected from one or more of (i) amorphous EVA copolymers; (ii) EVA copolymers wherein each has melting peak temperatures of 100° C. or less; or (iii) combinations thereof; (B) from about 0.1 wt % to about 10 wt % of one or more polyamides; wherein the weight percent of each of the polyamide and EVA component is based on the total combined amount of EVA component and polyamides in the blend, and the blend composition has a Mooney viscosity determined according to ASTM D1646, ML 1+4 at 100° C. less than 200; and (C) a peroxide curative.

Also disclosed herein are processes for producing the heat resistant curable ethylene vinyl acetate (EVA) copolymer-polyamide blend composition.

Another disclosure herein are articles prepared from the heat resistant curable ethylene vinyl acetate (EVA) copolymer-polyamide blend composition, and a process for making them.

DETAILED DESCRIPTION OF THE INVENTION

The present invention is directed to a curable blend composition comprising ethylene vinyl acetate (EVA) copolymer and polyamide and a peroxide curative that, exhibits enhanced resistance to physical property loss during hot air aging. The invention is also directed to processes for preparation of the curable EVA copolymer-polyamide blend compositions, and processes for preparation of cured articles from the curable EVA copolymer-polyamide blend compositions.

It has been found that when low levels of polyamide polymers are dispersed in EVA copolymers, the resultant compositions, when cured, exhibit surprising improvements in physical properties. That is, the curing process, which is also commonly referred to as crosslinking or vulcanization, converts the EVA copolymer-polyamide blend composition to an EVA composition that exhibits enhanced hot air aging resistance compared to EVA compositions lacking polyamide. Depending on the vinyl acetate content, the neat EVA copolymer may be amorphous or may exhibit a melting peak temperature up to about 100° C. A benefit of the present invention is that the polyamide content in the curable EVA-polyamide blend is sufficiently low that the polyamide does not contribute significantly to the modulus or hardness of the cured article. Therefore, the polyamide can be incorporated into existing formulations for curable EVA compounds to improve hot air aging without altering other properties of the cured article.

One embodiment disclosed herein is a curable EVA copolymer composition that comprises a polymer blend of an EVA copolymer, polyamide, which together is referred to as an EVA copolymer-polyamide blend, and a curative, usually a peroxide curative. The EVA copolymer-polyamide blend composition is characterized as comprising from about 0.1 to about 10 weight percent polyamide based on the combined total amount of EVA copolymer and polyamide in the blend. The EVA copolymer component of the blend comprises one or more EVA copolymers, each exhibiting a melting peak temperature of 100° C. or less as determined by ASTM D3418-08, or an EVA component that is amorphous, or a combination of these.

The EVA copolymers useful in the practice of the invention described herein comprise copolymerized units of ethylene and vinyl acetate monomers. Other comonomers may optionally be present, including alkyl esters or alkoxyalkyl esters of propenoic acid, carbon monoxide, alpha-olefins such as propene, 1-butene, 1-hexene, and the like, or comonomers that provide epoxide, anhydride, or acid functionality in the EVA polymer, for example glycidyl methacrylate, maleic anhydride and its half esters, or (meth) acrylic acid. Because the blend compositions of the present invention comprise low levels of polyamide, comonomers in the EVA copolymer that provide acid, epoxide, or anhydride functionality are generally not needed to compatibilize the EVA copolymer and polyamide components. Preferably, comonomers comprising acid, epoxide, or anhydride moieties are absent from the EVA copolymer.

The concentration of vinyl acetate comonomer present in these EVA copolymers is not particularly limiting, provided the melting peak temperature of the EVA copolymer is less than about 100° C. Typically, EVA copolymers comprising from about 18% to about 90% by weight vinyl acetate based on the weight of the EVA may be used to prepare curable EVA-polyamide blends of the invention. Examples of useful EVA copolymers include Elvax® resin grades such as 40L03, 265, and 460 available from E. I. du Pont de Nemours and Company, Wilmington, Del., USA and Levapren® grades 400 through 900, available from Lanxess Corp. In some embodiments, the EVA copolymers are amorphous polymers, rather than semi-crystalline thermoplastics. For the present invention, an EVA copolymer is considered to be amorphous if it exhibits no first order thermal transition when tested in accordance with ASTM D3418-08. An amorphous EVA copolymer therefore does not possess a melting peak temperature.

The EVA copolymers that are used to prepare the curable EVA-polyamide blend compositions of the invention are substantially uncured. By substantially uncured is meant that the unblended EVA copolymer has a sufficiently low viscosity to be shaped into a finished article by molding or extrusion. Preferably, the Mooney viscosity determined according to ASTM D1646, ML 1+4 at 100° C. of the EVA copolymer component is less than 120, more preferably less than 80 and most preferably less than 40. By curable is meant that the composition intended for production of a molded or extruded article (i.e. the composition that includes EVA copolymer, polyamide, peroxide and optionally fillers, coagents, process aids, plasticizers, pigments, release aids, and other conventional ingredients found in curable EVA compounds) exhibits an increase in torque (MH-ML) when tested in a rotorless cure meter per ASTM D5289-07a at conditions of 177° C. for 24 minutes of at least 2.5 dN-m, more preferably at least 4 dN-m, and most preferably more than 5.5 dN-m.

The polymer blend composition comprises one or more polyamides. Preferably, the polyamides have a melting peak temperature of at less than about 270° C. as determined in accordance with ASTM D3418-08. Because the polyamide in the inventive compositions is present at low levels of from about 0.1 wt % to about 10 wt %, there is no requirement that the polyamide remain solid (unmelted) at the curing temperature of the curable composition. Polyamide resins are well known in the art and embrace those semi-crystalline resins having a weight average molecular weight of at least 5,000 and include those compositions commonly referred to as nylons. Thus, the polyamide component useful in the practice of the invention includes polyamides and polyamide resins, or combinations or mixtures of these, such as nylon 6, nylon 7, nylon 6/6, nylon 6/10, nylon 6/12, nylon 11, nylon 12, polyamides comprising aromatic monomers, polyamide block elastomers, such as copoly(amide-ether) or copoly(amide-ester), and polyamide multipolymers made from a mixture of polyamide forming monomers such that the polyamide comprises a mixture of at least two types of polyamide structural units. The resins may be in any physical form, such as pellets and particles of any shape or size, including nanoparticles.

The polyamide resin can be produced by condensation polymerization of equimolar amounts of a saturated dicarboxylic acid containing from 4 to 12 carbon atoms with a diamine, which diamine contains from 4 to 14 carbon atoms. The polyamide may also be prepared by a ring opening polymerization reaction such as nylon 6, or by condensation of aminocarboxylic acids such as nylon 7 or 11.

Examples of polyamides include polyhexamethylene adipamide (66 nylon), polyhexamethylene azelaamide (69 nylon), polyhexamethylene sebacamide (610 nylon) and polyhexamethylene dodecanoamide (612 nylon), the polyamide produced by ring opening of lactams, i.e. polycaprolactam, polylauriclactam, poly-11-aminoundecanoic acid, and bis(p-aminocyclohexyl)methanedodecanoamide. It is also possible to use polyamides prepared by the polymerization of two of the above polymers or terpolymerization of the above polymers or their components, e.g. an adipic acid isophthalic acid hexamethylene diamine elastomer.

Typically, polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic.

Fully aliphatic polyamides useful in practice of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to elastomers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid, pimelic acid, suberic acid, azelaic acid, decanedioic acid, dodecanedioic acid, tridecanedioic acid, tetradecanedioic acid, and pentadecanedioic acid. Diamines can be chosen from diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides are also suitable for use in the present invention. Such polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids. Alternatively, an aromatic diamine such as meta-xylylene diamine can be used to provide a semi-aromatic polyamide, an example of which is a homopolymer comprising meta-xylylene diamine and adipic acid.

Block copoly(amide) elastomers are also suitable for use as the polyamide component. If a low softening point material comprises the block copoly(amide) elastomer, e.g., a polyether oligomer or a polyalkylene ether, for example, poly(ethylene oxide), then the block polymer will be a copoly(amide-ether). If a low softening point material of the block copoly(amide) elastomer comprises an ester, for example, a polylactone such as polycaprolactone, then the block elastomer will be a copoly(amide-ester). Any such low softening point materials may be used to form a block copoly(amide) elastomer. Optionally, the lower softening point material of the block copoly(amide) elastomer may comprise a mixture, for example, a mixture of any of the above-mentioned lower softening point materials. Furthermore, said mixtures of lower softening point materials may be present in a random or block arrangement, or as mixtures thereof. Preferably, the block copoly(amide) elastomer is a block copoly(amide-ester), a block copoly(amide-ether), or mixtures thereof. More preferably, the block copoly(amide) elastomer is at least one block copoly(amide-ether) or mixtures thereof. Suitable commercially available thermoplastic copoly(amide-ethers) include PEBAX® polyether block amides from Elf-Atochem, which includes PEBAX® 4033 and 6333. Most preferably, the polyamide is other than a block copoly(amide-ether) or copoly(amide-ester). Other polyamides are generally more effective in stabilizing the EVA copolymer. Poly(amide-ethers) also exhibit poorer hot air aging as compared to conventional polyamides lacking a polyether block.

Preferred polyamides are homopolymers or copolymers wherein the term copolymer refers to polyamides that have two or more amide and/or diamide molecular repeat units.

The polyamide component may comprise one or more polyamides selected from Group I polyamides having a melting peak temperature of at least about 160° C., but less than about 210° C., and comprising an aliphatic or semi-aromatic polyamide, for example poly(pentamethylene decanediamide), poly(pentamethylene dodecanediamide), poly(ε-caprolactam/hexamethylene hexanediamide), poly(ε-caprolactam/hexamethylene decanediamide), poly(12-aminododecanamide), poly(12-aminododecanamide/tetramethylene terephthalamide), and poly(dodecamethylene dodecanediamide); Group (II) polyamides having a melting peak temperature of at least about 210° C., and comprising an aliphatic polyamide selected from the group consisting of poly(tetramethylene hexanediamide), poly(ε-caprolactam), poly(hexamethylene hexanediamide), poly(hexamethylene dodecanediamide), and poly(hexamethylene tetradecanediamide); Group (III) polyamides having a melting peak temperature of at least about 210° C., and comprising about 20 to about 35 mole percent semiaromatic repeat units derived from monomers selected from one or more of the group consisting of (i) aromatic dicarboxylic acids having 8 to 20 carbon atoms and aliphatic diamines having 4 to 20 carbon atoms; and about 65 to about 80 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (IV) polyamides comprising about 50 to about 95 mole percent semi-aromatic repeat units derived from monomers selected from one or more of the group consisting of aromatic dicarboxylic acids having 8 to 20 carbon atoms and aliphatic diamines having 4 to 20 carbon atoms; and about 5 to about 50 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (V) polyamides having a melting peak temperature of at least about 260° C., comprising greater than 95 mole percent semi-aromatic repeat units derived from monomers selected from one or more of the group consisting of aromatic dicarboxylic acids having 8 to 20 carbon atoms and aliphatic diamines having 4 to 20 carbon atoms; and less than 5 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms. The polyamide may also be a blend of two or more polyamides.

Nylon multipolymers are also suitable for use in the present invention. These multipolymers combine structural units of various nylon types such as 6, 6/6, 6/10, 6/12, etc., within a polymer molecule to form polyamides having a peak melting temperature typically less than 160° C. In certain instances, the low melting peak temperature of the nylon multipolymer enables melt mixing the EVA copolymer, nylon multipolymer, and peroxide in a single pass.

Preferred polyamides include nylon 6, 6/10, 10/10, 11, 6/12, 12, 6/6, Group (IV) polyamides having a melting peak temperature less than about 270° C., and nylon multipolymers. These polyamides have a melting peak temperature sufficiently low so as not to cause significant degradation of the blends during production.

Polyamides suitable for use in the invention are widely commercially available, for example Zytel® and Elvamide® resins, available from E. I. du Pont de Nemours and Company, Wilmington, Del., USA, Durethan® resins, available from Lanxess, Germany, and Ultramid® resins available from BASF, USA.

In the present invention, the EVA copolymer-polyamide blend comprises (i) from about 99.9 weight percent to about 90 weight percent of one or more of EVA copolymer component described herein and (ii) from about 0.1 to about 10 weight percent of one or more polyamide described herein, wherein each of (i) and (ii) are based on the combined total weight of the EVA copolymer and polyamide components. The EVA copolymer component may be made up of one or more than one EVA copolymer of the type described herein as being suitable for use in the practice of the invention. Similarly, the polyamide component may be made up of one or more than one polyamide of the type described herein as being suitable for use in the practice of the invention. Preferably, the curable compositions will comprise from about 99.5 to about 90 weight percent EVA copolymer component and from about 0.5 to about 10 weight percent polyamide component, based on the total weight of the EVA copolymer and polyamide components. More preferably, the curable compositions will comprise from about 99 to about 95 weight percent EVA copolymer component and from about 1 to about 5 weight percent polyamide component based on the total weight of the EVA copolymer and polyamide components. These ratios provide sufficient polyamide such that a cured article made from the curable EVA-polyamide blend exhibits good resistance to hot air aging, but the presence of the polyamide does not significantly increase the hardness and/or modulus of the cured article compared to an otherwise identical EVA compound lacking polyamide.

The curable EVA copolymer compositions described herein also comprise a peroxide curative. Suitable peroxide curatives, also known as peroxide curing systems, comprise a peroxide and optionally a coagent. Examples of peroxides and coagents include curative systems as generally known in the art, including those described herein, operative at the temperature employed during vulcanization. For example, useful organic peroxides are those that decompose rapidly within the temperature range of 150° C. to 220° C. These include, for example, dicumyl peroxide, 2,5-bis(t-butylperoxy)-2,5-dimethylhexane, and α',α'-bis(t-butylperoxy)-diisopropylbenzene (available from Arkema under the tradename Vul-Cup®). In a typical vulcanizate composition the peroxide is present in amounts of from about 0.5 to 5 parts phr (parts per hundred parts rubber, i.e. parts per hundred parts of the one or more EVA polymers present). The peroxide may be adsorbed on an inert carrier such as calcium carbonate, carbon black or kieselguhr; however, the weight of the carrier is not included in the above range. Generally, an optional coagent will be present to increase the state of cure of the finished part. The coagent can be for example, N,N'-(m-phenylene) dimaleimide, trimethylolpropane trimethylacrylate, tetraallyloxyethane, triallyl cyanurate, tetramethylene diacrylate, or polyethylene oxide glycol dimethacrylate. A preferred coagent is N,N'-(m-phenylene) dimaleimide, available from E. I. du Pont de Nemours and Company as HVA-2. The amount of the coagent used is generally about 0 to 5 parts by weight per 100 parts EVA polymer (phr), preferably about 1 to 5 parts phr. The coagents usually contain multiple unsaturated groups such as allyl groups or acrylic ester groups. While their mode of action is not known with certainty, it is thought that they react with the initial radical formed on the polymer backbone to form a more stable radical, which undergoes coupling reactions to form crosslinks more readily than chain scission reactions.

The polymer blend component of the curable EVA-polyamide blend compositions may be formed by mixing about 0.1 to about 10 wt % of the one or more polyamides with about 90 to about 99.9 wt % of the EVA copolymer component at a temperature greater than the melting peak temperature of the polyamide component and, if the EVA copolymer component exhibits a melting peak temperature, at a temperature greater than the melting peak temperature of the EVA copolymer component, under conditions that do not produce a dynamic cure of the EVA copolymer. If a curative is present during the mixing process, one skilled in the art can select a temperature that will allow for mixing of the EVA and polyamide without causing a dynamic cure of the blend. By dynamic cure is meant mixing EVA copolymer-polyamide blend in the presence of a curative while simultaneously expending, decomposing, or consuming the curative. Because a dynamic cure leaves little or no longer active curative remaining after the mixing process, the resulting composition will not exhibit a cure response as measured per ASTM D5289-07a using an MDR 2000 from Alpha Technologies operating at 0.5° arc and at test conditions of 177° C. for 24 minutes. If the polyamide component exhibits a melting peak temperature of 160° C. or greater, then the curative, generally a peroxide curative, will not be present when the polyamide component and the EVA copolymer component are being mixed. This is because temperatures of 160° C. or greater tend to cause peroxide decomposition and hence crosslinking and/or gelling of the EVA copolymer. Gelling or crosslinking of the EVA copolymer during mixing with molten polyamide may produce a high viscosity blend that is difficult or impossible to further form into a finished article. In particular, a blend with a gelled or crosslinked EVA component may exhibit a Mooney viscosity (ML 1+4, 100° C.) greater than 200, or it may exhibit flow behavior such that the Mooney viscosity cannot be measured. Inability to measure a Mooney viscosity of the blend occurs either because the blend cannot be formed into the Mooney test specimen by conventional rubber processing, or because the test specimen crumbles during the Mooney test.

After mixing the EVA copolymer component and the one or more polyamide wherein the polyamide component exhibits a melting peak temperature of 160° C. or greater, the blend is cooled to a temperature less than 160° C., preferably to a temperature less than 140° C., and most preferably to a temperature less than 120° C. prior to forming a curable composition of the invention by mixing the blend with peroxide curative. The blend can also be cooled to room temperature.

In general, compositions that result from mixing EVA copolymers and polyamides may comprise a wide range of blend morphologies, ranging from those wherein discrete, discontinuous polyamide particles exist within a continuous EVA copolymer matrix, to compositions wherein high aspect ratio polyamide "fibers" are present, to compositions that comprise co-continuous structures, to compositions comprising discrete EVA copolymer domains within a continuous phase of polyamide. Most of these compositions have morphologies that are unsuitable for use in the present invention, because the blends have very high Mooney viscosities, i.e. Mooney viscosity ML 1+4, 100° C. of greater than about 200, or exhibit such poor processability at temperatures less than the melting peak temperature of the polyamide that the Mooney viscosity cannot be measured. A Mooney viscosity greater than 200, or the inability to measure Mooney viscosity, indicates that the polyamide comprises a continuous or fibrous phase in the blend. Such blends exhibit poor processability for extrusion or molding, and poor elastic properties after curing if a cured article can successfully be formed. A Mooney viscosity less than 200, preferably less than 150, and most preferably less than 100, is confirmatory of a blend morphology wherein the EVA copolymer comprises a continuous phase, and the polyamide comprises a discontinuous phase. By "discontinuous polyamide phase" is meant that the polyamide is present in the polymer blend compositions of the invention as dispersed particles, or domains surrounded by a continuous EVA copolymer matrix. In general, the polyamide domains in the EVA-polyamide blend compositions of the invention will preferably be completely isolated from each other within the continuous EVA copolymer matrix. However, in certain instances a small percentage, less than about 5%, of localized sites in the polymer blend composition may exist wherein the polyamide domains are aggregated or connected to each other.

In one embodiment of the present invention, curable heat resistant EVA-polyamide blend compositions may be produced in a first step by mixing from about 0.1 to about 10 wt % polyamide component with about 90 to about 99.9 wt % EVA copolymer component wherein the EVA copolymer is amorphous or has a melting peak temperature of less than about 100° C., at a temperature greater than the melting peak temperature of the polyamide component and, if the EVA copolymer component exhibits a melting peak temperature, at a temperature greater than the melting peak temperature of the EVA copolymer component, under conditions that do not produce a dynamic cure of the EVA copolymer. The EVA copolymer-polyamide blend from the first step has a Mooney viscosity less than 200, preferably less than 150, and most preferably less than 100, to ensure that the EVA copolymer comprises the continuous phase in the blend and the polyamide comprises a discontinuous phase. If necessary the blend is cooled to a temperature of less than 160° C. A peroxide curative is added to the blend to form the curable EVA copolymer-polyamide blend composition.

In another embodiment, curable EVA-polyamide blend compositions may be produced in a first step by mixing from about 0.1 to about 60 wt % polyamide component with about 40 to about 99.9 wt % EVA copolymer component wherein the EVA copolymer is amorphous or has a melting peak temperature of less than about 100° C., at a temperature greater than the melting peak temperature of the polyamide component and, if the EVA copolymer component exhibits a melting peak temperature, at a temperature greater than the melting peak temperature of the EVA copolymer component, under conditions that do not produce a dynamic cure of the EVA copolymer. The intermediate EVA copolymer-polyamide blend composition from the first step has a Mooney viscosity less than 200, preferably less than 150, and most preferably less than 100, to ensure that the EVA copolymer comprises the continuous phase in the blend and the polyamide comprises a discontinuous phase. In a second step, the intermediate EVA—copolymer polyamide blend composition from the first step is mixed with additional EVA copolymers of the same or different type as used in the mixing process of the first step, provided that the one of more EVA copolymers introduced in the second step have melting peak temperatures less than 100° C., and the resulting EVA copolymer-polyamide blend from the second step comprises 0.1 to 10 wt % polyamide and has a Mooney viscosity less than 200. The temperature used for mixing of the second step may be any convenient temperature, either less than or greater than the melting peak temperature of the polyamide component, and if the EVA copolymer exhibits a melting peak temperature, at a temperature either less than or greater than the melting peak temperature of the EVA copolymer component. Preferably, the temperature used for the second mixing step is less than the melting peak temperature of the polyamide. Most preferably, the temperature used for the second mixing step is less than the melting peak temperature of the polyamide, and if the EVA copolymer component exhibits a melting peak temperature, at a temperature greater than the melting peak temperature of the EVA copolymer component. To form a curable composition of the invention, peroxide curative is mixed with the EVA copolymer-polyamide blend of the second step at a temperature less than 160° C. In some embodiments, peroxide curative can be present in the second mixing step, thereby providing a curable EVA copolymer-polyamide composition of the invention without the need for subsequent mixing.

If the polyamide exhibits a melting peak temperature less than 160° C., then under certain conditions, depending on the type of peroxide and the mixing time and temperature, it can be possible to mix the EVA copolymer, polyamide, and peroxide at a temperature greater than the melting peak temperature of the polyamide component and, if the EVA copolymer exhibits a melting peak temperature, at a temperature greater than the melting peak temperature of the EVA copolymer component, in a single pass without premature gelling or crosslinking of the EVA copolymer. Such conditions are known to those skilled in the art, and may easily be determined by comparing the Mooney viscosities (ML 1+4, 100° C.) of compounds mixed under similar conditions, wherein the compounds differ only in the presence or absence of a peroxide curative. A Mooney viscosity difference of 10 points or less is confirmatory of a suitable mixing process for single pass mixing with EVA copolymer, polyamide, and peroxide. Alternatively, the EVA copolymer-polyamide blend composition may be cooled to a temperature less than the mixing temperature prior to compounding the blend with peroxide to form a curable composition.

The addition of curative to the EVA copolymer-polyamide blend will desirably take place at a temperature below the decomposition temperature of the peroxide and below the temperature at which the crosslinking reaction occurs. Generally, the addition will take place at a temperature below 140° C., preferably at a temperature no greater than 120° C. The addition of the curative may take place simultaneously with the addition of optional processing ingredients, such as colorants, carbon black or mineral reinforcing agents, antioxidants, processing aids, fillers and plasticizers, or it may be an operation separate from addition of the other ingredients. The addition may be conducted on a two-roll rubber mill or by using internal mixers suitable for compounding gum rubber compositions, including Banbury® internal mixers, Haake Rheocord® mixers, Brabender® mixers, Farrel Continuous Mixers, or single and twin screw extruders.

After addition of the curatives and other optional ingredients such as fillers, plasticizers, pigments, antioxidants, process aids, etc., to the EVA copolymer-polyamide blend, the resulting compound desirably exhibits a strong cure response as determined in accordance with ASTM D5289-07a using an MDR 2000 from Alpha Technologies operating at 0.5° arc and at test conditions of 177° C. for 24 minutes. Preferably, the increase in torque measured in this test is at least 2.5 dN-m, more preferably at least 4 dN-m, and most preferably at least 5.5 dN-m. The increase in torque is the difference MH-ML, where ML refers to the minimum torque value measured and MH refers to the maximum torque value attained after the measurement of ML.

To achieve optimal heat aging resistance, an antioxidant is desirably added to the curable EVA copolymer-polyamide blend composition prior to curing. Useful antioxidants include, but are not limited to, aryl amines, phenolics, imidazoles, and phosphites. Thus, in some embodiments, the antioxidant will be a phosphorus ester antioxidant, a hindered phenolic antioxidant, an amine antioxidant, or a mixture of two or more of these compounds. The proportion of the antioxidant compound in the composition is typically 0.1 to 5 phr, preferably about 0.5 to 2.5 phr. The weight ratio of the phenolic or amine antioxidant to the phosphorus compound in the mixtures is about 0.5 to 3, and preferably the ratio is about 1.

Examples of aryl amines that may be useful antioxidants include 4,4'-bis(α,α-dimethylbenzyl)diphenylamine, diphenylamine and alkylated diphenylamines, 4-aminodiphenyl amine, and N-phenyl-N'-(p-toluenesulfonyl)-p-phenylenediamine. Examples of phenolic antioxidants include 4,4'-butylenebis(6-t-butyl-m-cresol), 1,3,5-trimethyl-2,4,6-tris-(3,5-di-t-butyl-4-hydroxybenzyl)benzene, and 4,4'-thiobis-(3-methyl-6-t-butylphenol). Examples of phosphite antioxidants include triphenylphosphite, bis(2,4-di-t-butyl-phenyl)pentaerythritol diphosphite, and tris(2,4-ditert-butylphenyl)phosphite. Examples of imidazole antioxidants include 2-mercaptomethylbenzimidazole, 2-mercaptobenzimidazole, and zinc 4- and -5-methyl-2-mercapto-benzimidazole. Combinations of antioxidants may be used, generally at levels between 0.5 and 5 phr based on 100 parts of the EVA copolymer in the compound.

Suitable hindered phenolic antioxidants can be, for example 4,4'-butylidenebis(6-t-butyl-m-cresol), 1,3,5-trimethyl-2,4,6-tris-(3,5-di-t butyl-4-hydroxybenzyl)benzene, 2,6-di-t-butyl-α-dimethylamino-p-cresol and 4,4'-thiobis-(3-methyl-6-t-butylphenol).

Antioxidants comprising the salt of a strong base and a weak acid, optionally combined with a carbodiimide, as disclosed in EP1081188, may also be used in the EVA copolymer-polyamide blends.

Preferred antioxidant compositions contain tri(mixed mono- and dinonylphenyl) phosphate mixed with either 4,4'-butylidenebis(6-t-butyl-m cresol) or 4,4'-bis(α,α-dimethylbenzyl)diphenylamine. Preferred antioxidant compositions contain 4,4'-bis(α,α-dimethylbenzyl)diphenylamine (available commercially as Naugard® 445 from Chemtura Corp.). Antioxidants may be added while the EVA copolymer is melt mixed with the polyamide, or after the blend has cooled.

The compositions of the invention may also comprise polymers with amine or acid reactive functionality provided that when addition of such polymers occurs at a temperature above the melting peak temperature of the polyamide component the presence of such polymers does not increase the Mooney viscosity (ML 1+4, 100° C.), as determined according to ASTM D1646, of the resulting composition to above 200. Ethylene copolymers comprising copolymerized or grafted amine or acid reactive functionality may be useful in improving properties such as tensile strength and elongation of the cured EVA-polyamide blend compositions. Mention may be made of ethylene copolymers of propylene, 1-butene, 1-hexene, 1-octene, vinyl acetate, methylacrylate, ethylacrylate, or butylacrylate that have been grafted with maleic anhydride or glycidylmethacrylate. Such polymers are available from E. I. du Pont de Nemours and Company as Fusabond® C250 or N493 resins. Mention may also be made of ethylene copolymers comprising copolymerized units of maleic or fumaric acid, or their half esters or diesters and ethylene (meth)acrylate elastomers. Such polymers are available from E. I. du Pont de Nemours and Company as Vamac® ethylene acrylic elastomer. To be effective, the amine or acid reactive ethylene copolymer must be present in the blend when the polyamide is molten. Preferably, less than 30 parts of ethylene copolymer comprising copolymerized or grafted amine or acid reactive functionality per 100 parts by weight of the EVA copolymer will be present in the EVA copolymer-polyamide blend, more preferably less than 10 parts, and most preferably zero parts.

In other embodiments, the curable EVA copolymer-polyamide blend compositions of the invention may be blended with another polymer including a polymer containing polyamide, e.g. an elastomer to dilute the polyamide content of the inventive composition by any mixing process, either above or below the melting peak temperature of the polyamide, providing the presence of the additional polymer does not increase the Mooney viscosity (ML 1+4, 100° C.) of the resulting composition to above 200. The polymer used for the blending process may be for example, hydrogenated nitrile rubber, polyepichlorohydrin rubber, copolymers of ethylene and alpha-olefins such as propylene, 1-butene, 1-hexene, 1-octene and the like, fluoroelastomer, and may further comprise fillers, curatives, or other ingredients. Preferably, such dilution occurs at a temperature less than that of the melting peak temperature of the polyamide, and less than the temperature needed to initiate curing.

In addition, the curable EVA copolymer-polyamide compositions may optionally comprise components including plasticizers, process aids, waxes, pigments, and colorants. Such optional components will generally be present in amounts of from about 0.1 phr to about 150 phr, based on the weight of the EVA copolymer. The addition of such optional components may take place during preparation of the EVA copolymer-polyamide blend or at the time of mixing of curative with the blend.

Curing or crosslinking (also referred to as vulcanization) of the curable EVA-polyamide blend compositions of the invention typically involves exposing the curable composition, containing any optional ingredients (i.e. a second curable compound) to elevated temperature and elevated pressure for a time sufficient to crosslink the EVA copolymer. Such operations generally are conducted by placing the curable EVA-polyamide blend composition into a mold that is heated in a press (often referred to as press-curing). Alternatively, the curable compositions may be extruded into various shapes. Such extruded shapes or parts are often cured in a pressurized autoclave. After the press cure or autoclave cycle is completed, this initial cure may be followed by an optional post-cure heating cycle at ambient pressure to further cure the EVA copolymer. For example, the vulcanizate may be formed and cured using conventional press cure procedures at about 160° C. to about 220° C. for about 2 to 60 minutes. Post-cure heating may be conducted at about 160° C. to about 200° C. for several minutes to several hours. Once crosslinked, the compositions described herein are not thermoplastic, but thermoset. Suitable cure conditions will depend on the particular curable compound formulation and are known to those of skill in the art.

In further embodiment, the invention is directed to a process for production of a cured article from an EVA copolymer-polyamide blend composition comprising a first step of providing curable EVA copolymer-polyamide composition as described herein, and heating the curable blend composition to a temperature of at least 160° C. for one minute to form a cured article. Forming the article may be done prior to curing or concurrently.

The cured articles prepared from the EVA-polyamide blend compositions described herein exhibit unusually good resistance to embrittlement during heat aging, as evidenced by a reduction in the amount of decrease in tensile elongation at break following heat aging at 175° C. for one to two weeks and a reduction in the increase in Shore A hardness as a result of heat aging. For example, inclusion of 2 wt % polyamide in a curable EVA compound can decrease the percentage loss of tensile elongation after hot air aging for one week at 175° C. by over 70%, and limit the change in Shore A hardness after hot air aging for two weeks at 175° C. from about 17 points to 4. This degree of improvement is unusual. Furthermore, these advantages in heat aging are gained with no sacrifice in compression set resistance.

Cured articles of the EVA-polyamide blend compositions prepared by the processes described herein can be used in a wide variety of industrial applications, for production of articles including wire and cable jacketing, spark plug boots, hoses, belts, miscellaneous molded boots, seals and gaskets. Hose applications include turbocharger hoses, transmission oil cooler hoses, power steering hoses, air conditioning hoses, air ducts, fuel line covers, and vent hoses.

Examples of seals include engine head cover gaskets, oil pan gaskets, oil seals, lip seal packings, O-rings, transmission seal gaskets, seal gaskets for a crankshaft or a camshaft, valve stem seals, power steering seals, and belt cover seals.

Automotive tubing applications include axle vent tubing, PCV tubing and other emission control parts. The vulcanizates are also useful for manufacture of crankshaft torsional dampers where high damping over a broad temperature range is needed under high compressive and shear strains. The vulcanizates also can be used to prepare noise management parts such as grommets.

The invention is further illustrated by the following examples wherein all parts are by weight unless otherwise indicated.

EXAMPLES

Materials
EVA Copolymers
A1 Copolymer of ethylene and 45 wt % vinyl acetate with a Mooney viscosity (ML 1+4) at 100° C. of 19 and a melting peak temperature of 39° C., available from Lanxess Corp. as Levapren® 450 resin.
A2 Copolymer of ethylene and 50 wt % vinyl acetate with a Mooney viscosity (ML 1+4) at 100° C. of 25 and a melting peak temperature of 32° C., available from Lanxess Corp. as Levapren® 500 resin.
A3 Copolymer of ethylene and 40 wt % vinyl acetate with a Mooney viscosity (ML 1+4) at 100° C. of 17 and a melting peak temperature of 50° C., available from E.I. du Pont de Nemours and Company as Elvax® 40L03 resin.
A4 Copolymer of ethylene and 28 wt % vinyl acetate with a Mooney viscosity of 18 and a melting peak temperature 76° C., available from E.I. du Pont de Nemours and Company as Elvax® 265 resin.
A5 Copolymer of ethylene and 18 wt % vinyl acetate with a Mooney viscosity of 20 and a melting peak temperature of 86° C., available from E.I. du Pont de Nemours and Company as Elvax® 460 resin.
Polyamides
P1 Polyamide multipolymer having a melting peak temperature of 115° C., available from E.I. DuPont de Nemours and Company as Elvamide® 8066.
P2 Polyamide multipolymer having a melting peak temperature of 156° C., available from E.I. DuPont de Nemours and Company as Elvamide® 8061.
P3 Polyamide 6/10, having a melting peak temperature of 225° C., available from E.I. DuPont de Nemours and Company as Zytel® 3090.
P4 Polyamide 11 having a melting peak temperature of 182° C., available from Arkema Inc as Rilsan® BESNO TL.
Other Ingredients
Peroxide: mixture of the para and meta isomers of an $\alpha,\alpha'$-bis(tert-butylperoxy)-diisopropylbenzene, 40% peroxide active ingredient on kaolin clay carrier, Vulcup® 40KE, available from Arkema Inc.
Coagent: N,N'-(m-phenylene)dimaleimide, HVA-2, available from E.I. du Pont de Nemours and Company.
Carbon black: N550 grade, Sterling® SO carbon black, available from Cabot Corp.
Antioxidant: Naugard® 445 antioxidant, available from Chemtura Corp.
Test Methods
Mooney viscosity: ASTM D1646, ML 1+4, 100° C.
Cure response: Measured per ASTM D5289-07a using an MDR 2000 from Alpha Technologies operating at 0.5° arc. Test conditions of 177° C. for 24 minutes. ML refers to the minimum torque value measured during the test, while MH refers to the maximum torque value attained after ML.
Compression set: ISO 815-1:2008, 25% compression, using type B molded buttons prepared using press cure conditions of 175° C. for 10 minutes followed by a 30 minute post cure in a hot air oven at 175° C. Time and temperature of the test conditions as specified. Data reported are the median values of 3 specimens.
Tensile properties: ASTM D412-06, die C. Samples cut from 1.5 to 2.5 mm thick test specimens press cured at 175° C. for 10 minutes and post cured 30 minutes at 175° C. in a hot air oven, followed by aging for 24 hours at ambient conditions of 23° C. and 50% relative humidity. Data reported are the median value of 3 specimens. The rupture properties of tensile strength and elongation are indicated as Tb and Eb, (tensile at break and elongation at break, respectively). Test temperature is 23° C.±2° C. Shore A hardness: measured using 6 mm thick samples composed of 2 mm thick plies, cured and post cured as described for tensile properties, aged for 24 hours at ambient conditions of 23° C. and 50% relative humidity, per ASTM D2240-05 test method, using a type 2 operating stand. The median value of 5 readings is reported.

Heat aging: Tensile specimens, prepared as described above are hung in a hot air oven for the specified time and temperature. The specimens are conditioned at ambient conditions of 23° C. and 50% RH for at least 24 hours before tensile properties are measured.

Melting peak temperature: Measured in accordance with ASTM D3418-08.

Example 1

EVA copolymer-polyamide blends B1-B10 were prepared by mixing EVA copolymer A1 with polyamide (P1 or P2) in the ratios shown in Table 1. The EVA copolymer-polyamide blends were prepared as follows. The EVA and polyamide polymers were charged to a Haake Rheocord® mixing bowl equipped with roller blades, operated at a set temperature indicated in the Table and at a rotor speed of about 30 rpm. Once the mixing bowl was fully charged, the rotor speed was increased to 100 rpm. Polymer batch melt temperature was monitored, and when it reached the set temperature, a timer was started. Cooling was initiated as needed to ensure the temperature of the polymer blend was in the range of 20° C. to 35° C. greater than the melting peak temperature of the polyamide. After three minutes of mixing, the rotors were stopped. The EVA copolymer-polyamide blend was then removed from the bowl and cooled to room temperature (about 25° C.) before further processing.

TABLE 1

| | B1 % | B2 % | B3 % | B4 % | B5 % | B6 % | B7 % | B8 % | B9 % | B10 % |
|---|---|---|---|---|---|---|---|---|---|---|
| A1 | 99.9 | 99.5 | 99.01 | 98.04 | 95.24 | 99.5 | 99.01 | 98.04 | 95.24 | 90.91 |
| P1 | 0.1 | 0.5 | 0.99 | 1.96 | 4.76 | | | | | |
| P2 | | | | | | 0.5 | 0.99 | 1.96 | 4.76 | 9.09 |
| Mixer set temperature | | | | | | | | | | |
| deg C. | 130 | 130 | 130 | 130 | 130 | 170 | 170 | 170 | 170 | 170 |
| Mooney Viscosity | | | | | | | | | | |
| MU | 19 | 19 | 19 | 19 | 21 | 21 | 20 | 21 | 21 | 22 |

As shown in Table 1, blends B1-B10 exhibited Mooney viscosities that differed only slightly from that of the base EVA copolymer A1, demonstrating that up to 9.09% polyamide can be dispersed in EVA copolymer without significantly affecting processability.

EVA copolymer A1 and blends B1-B10 were compounded according to the formulations shown in Table 2 to form curable compounds C1 and E1-E10. Compound C1 is a comparative example and lacks polyamide, while E1-E10 comprise 0.1 wt % to 9.09 wt % of either polyamide P1 or P2. The curable compounds in Table 2 were mixed using a Brabender Plasti-Corder® equipped with a Prep-Mixer® mixing bowl fitted with cam blades, followed by a final mixing and sheeting on a roll mill at a temperature of about 50° C. In the mixing bowl, the maximum batch temperature was about 100° C.

TABLE 2

| | C1 phr | E1 phr | E2 phr | E3 phr | E4 phr | E5 phr | E6 phr | E7 phr | E8 phr | E9 phr | E10 phr |
|---|---|---|---|---|---|---|---|---|---|---|---|
| A1 | 100 | | | | | | | | | | |
| B1 | | 100.1 | | | | | | | | | |
| B2 | | | 100.5 | | | | | | | | |
| B3 | | | | 101 | | | | | | | |
| B4 | | | | | 102 | | | | | | |
| B5 | | | | | | 105 | | | | | |
| B6 | | | | | | | 100.5 | | | | |
| B7 | | | | | | | | 101 | | | |
| B8 | | | | | | | | | 102 | | |
| B9 | | | | | | | | | | 105 | |

TABLE 2-continued

| | Curable Compound | | | | | | | | | | |
|---|---|---|---|---|---|---|---|---|---|---|---|
| | C1 phr | E1 phr | E2 phr | E3 phr | E4 phr | E5 phr | E6 phr | E7 phr | E8 phr | E9 phr | E10 phr |
| B10 | | | | | | | | | | | 110 |
| Peroxide | 5 | 5 | 5 | 5 | 5 | 5 | 5 | 5 | 5 | 5 | 5 |
| Coagent | 2 | 2 | 2 | 2 | 2 | 2 | 2 | 2 | 2 | 2 | 2 |
| Antioxidant | 1 | 1 | 1 | 1 | 1 | 1 | 1 | 1 | 1 | 1 | 1 |
| Carbon black | 30 | 30 | 30 | 30 | 30 | 30 | 30 | 30 | 30 | 30 | 30 |
| Polyamide content | | | | | | | | | | | |
| wt % | 0 | 0.1 | 0.5 | 0.99 | 1.96 | 4.76 | 0.5 | 0.99 | 1.96 | 4.76 | 9.09 |
| MDR cure response | | | | | | | | | | | |
| ML (dN-m) | 0.2 | 0.3 | 0.2 | 0.2 | 0.2 | 0.2 | 0.3 | 0.3 | 0.4 | 0.3 | 0.3 |
| MH (dN-m) | 9.1 | 9.1 | 8.6 | 8.5 | 8.2 | 8.1 | 7.8 | 9.8 | 6.3 | 8.5 | 8.2 |
| MH-ML (dN-m) | 8.9 | 8.8 | 8.3 | 8.2 | 8.0 | 7.8 | 7.6 | 9.5 | 5.9 | 8.3 | 8.0 |
| Shore A hardness and tensile properties after press cure and post cure | | | | | | | | | | | |
| Shore A | 62 | 62 | 60 | 61 | 62 | 63 | 61 | 60 | 62 | 60 | 61 |
| Tb (MPa) | 12.6 | 12.3 | 12.7 | 13.1 | 12.5 | 12.7 | 12.8 | 12.4 | 11.3 | 12.2 | 13.4 |
| Eb (%) | 215 | 230 | 215 | 215 | 210 | 235 | 210 | 235 | 175 | 215 | 240 |
| Shore A hardness and tensile properties after one week hot air aging at 175 C. | | | | | | | | | | | |
| Shore A | 59 | 59 | 61 | 61 | 62 | 65 | 57 | 60 | 63 | 64 | 65 |
| Tb (MPa) | 2.8 | 6.2 | 7.7 | 9.5 | 10.3 | 10.8 | 2.0 | 9.4 | 10.1 | 10.1 | 8.8 |
| Eb (%) | 50 | 165 | 175 | 225 | 225 | 205 | 75 | 260 | 180 | 195 | 165 |
| Change in properties after one week hot air aging at 175 C. | | | | | | | | | | | |
| Shore A (pts) | −3 | −4 | 1 | 0 | 0 | 2 | −4 | 0 | 1 | 3 | 4 |
| Tb (%) | −78 | −49 | −40 | −27 | −18 | −15 | −84 | −24 | −10 | −17 | −34 |
| Eb (%) | −77 | −28 | −19 | 5 | 7 | −13 | −64 | 11 | 3 | −9 | −31 |

The test results in Table 2 show that all the compounds exhibit good cure response and initial (unaged) physical properties after press cure and post cure. The presence of up to 9.09% polyamide has a negligible effect on the initial Shore A hardness or tensile properties of the cured articles. After one week of aging in hot air at 175° C., however, cured compounds E1-E10 comprising 0.1 wt % to 9.09 wt % polyamide P1 or P2 have two to four times greater tensile strength and elongation than compound C1 lacking polyamide.

Example 2

EVA copolymer-polyamide blends B11, B12, and B13 were prepared by mixing EVA copolymer A2 or A3 with polyamide P3 or P4 in the ratios shown in Table 3. These EVA copolymer-polyamide blends were prepared as described for blends B1 through B10 in Example 1.

TABLE 3

| | Blend | | |
|---|---|---|---|
| | B11 % | B12 % | B13 % |
| A2 | 60 | | |
| A3 | | 60 | 60 |
| P3 | 40 | 40 | |
| P4 | | | 40 |
| Mixer set temperature | | | |
| deg C. | 245 | 245 | 200 |
| Mooney Viscosity | | | |
| MU | 77 | 49 | 48 |

Blends B11-B13 were further diluted with EVA copolymers to form blends comprising 0.1 wt % to 10 wt % polyamide, as shown in Tables 4 and 5. The blends in Tables 4 and 5 were produced by roll mill mixing blends B11, B12, or B13 with EVA copolymers A2 or A3 at a temperature of about 50° C.

TABLE 4

| | Blend | | | | |
|---|---|---|---|---|---|
| | B14 phr | B15 phr | B16 phr | B17 phr | B18 phr |
| A2 | 99.85 | 99.246 | 98.48 | 96.94 | 92.11 |
| B11 | 0.25 | 1.256 | 2.53 | 5.1 | 13.16 |
| Polyamide content | | | | | |
| weight % | 0.1 | 0.5 | 1 | 2 | 5 |
| Mooney Viscosity | | | | | |
| MU | 24 | 24 | 24 | 24 | 25 |

TABLE 5

| | B19 phr | B20 phr | B21 phr | B22 phr | B23 phr | B24 phr | B25 phr | B26 phr | B27 phr | B28 phr | B29 phr |
|---|---|---|---|---|---|---|---|---|---|---|---|
| A3 | 99.85 | 99.246 | 98.48 | 96.94 | 92.11 | 99.85 | 99.246 | 98.48 | 96.94 | 92.11 | 83.33 |
| B12 | 0.25 | 1.256 | 2.53 | 5.1 | 13.16 | | | | | | |
| B13 | | | | | | 0.25 | 1.256 | 2.53 | 5.1 | 13.16 | 27.78 |
| Polyamide content | | | | | | | | | | | |
| weight % | 0.1 | 0.5 | 1 | 2 | 5 | 0.1 | 0.5 | 1 | 2 | 5 | 10 |
| Mooney Viscosity | | | | | | | | | | | |
| MU | 16 | 17 | 17 | 16 | 17 | 18 | 18 | 18 | 18 | 20 | 22 |

Blends B14 through B18 and EVA copolymer A2 were compounded to produce curable compounds C2 and E11 through E15 as shown in Table 6. The compounding procedure used a Brabender Plasti-Corder® equipped with a Prep-Mixer® mixing bowl fitted with cam blades, followed by a final mixing and sheeting on a roll mill at a temperature of about 50° C. In the mixing bowl, the maximum batch temperature was about 100° C.

TABLE 6

| | Compound | | | | | |
|---|---|---|---|---|---|---|
| | C2 phr | E11 phr | E12 phr | E13 phr | E14 phr | E15 phr |
| A2 | 100 | | | | | |
| B14 | | 100.1 | | | | |
| B15 | | | 100.5 | | | |
| B16 | | | | 101.01 | | |
| B17 | | | | | 102.04 | |
| B18 | | | | | | 105.27 |
| Peroxide | 2 | 2 | 2 | 2 | 2 | 2 |
| Coagent | 5 | 5 | 5 | 5 | 5 | 5 |
| Antioxidant | 1 | 1 | 1 | 1 | 1 | 1 |
| Carbon black | 30 | 30 | 30 | 30 | 30 | 30 |
| Polyamide content | | | | | | |
| wt % | 0 | 0.1 | 0.5 | 1 | 2 | 5 |
| MDR cure response | | | | | | |
| ML (dN-m) | 0.4 | 0.3 | 0.4 | 0.4 | 0.4 | 0.4 |
| MH (dN-m) | 13 | 12.8 | 12.8 | 12.6 | 13.2 | 13.8 |
| MH-ML (dN-m) | 12.6 | 12.5 | 12.4 | 12.2 | 12.8 | 13.4 |
| Shore A hardness and tensile properties after press cure and post cure | | | | | | |
| Shore A (pts) | 55 | 56 | 58 | 58 | 60 | 59 |
| Tb (MPa) | 15.4 | 13.7 | 14.7 | 14.5 | 16 | 15.6 |
| Eb (%) | 215 | 200 | 215 | 215 | 225 | 210 |
| Compression Set, 70 hours at 150° C. | | | | | | |
| % | 12 | 13 | 14 | 10 | 10 | 11 |
| Shore A hardness and tensile properties after one week hot air aging at 175° C. | | | | | | |
| Shore A (pts) | 56 | 57 | 56 | 52 | 54 | 59 |
| Tb (MPa) | 3.2 | 2.3 | 7.3 | 11 | 10.9 | 12.8 |
| Eb (%) | 45 | 50 | 165 | 245 | 215 | 215 |
| Shore A hardness and tensile properties after two weeks hot air aging at 175° C. | | | | | | |
| Shore A (pts) | 76 | nm | nm | 67 | 64 | 59 |
| Tb (MPa) | * | nm | nm | 3.3 | 4.5 | 7.1 |
| Eb (%) | * | nm | nm | 20 | 45 | 95 |

* too brittle to test
nm not measured

Test results in Table 6 show that the comparative compound C2 and inventive compounds E11 through E15 exhibit good cure response, Shore A hardness, and similar initial tensile properties and compression set resistance. After one week heat aging at 175° C., however, the inventive compounds comprising 0.5 wt % to 5 wt % polyamide P3 (i.e., E12-E15) exhibit good tensile strength and elongation, whereas compound C2 shows significant loss of properties. After two weeks hot air aging at 175° C., the inventive compound comprising 5% polyamide P3 still retains nearly 100% elongation to break, and exhibits no hardness increase compared to the unaged. The comparative compound is too brittle to test for tensile properties, and exhibits a 20 point Shore A hardness increase.

Blends B19 through B29 and EVA copolymer A3 were compounded to produce curable compounds C3 and E16 through E26 as shown in Table 7. The compounding procedure used a Brabender Plasti-Corder® equipped with a Prep-Mixer® mixing bowl fitted with cam blades, followed by a final mixing and sheeting on a roll mill at a temperature of about 50° C. In the mixing bowl, the maximum batch temperature was about 100° C.

TABLE 7

| | Compound | | | | | | | | | | | |
|---|---|---|---|---|---|---|---|---|---|---|---|---|
| | C3 phr | E16 phr | E17 phr | E18 phr | E19 phr | E20 phr | E21 phr | E22 phr | E23 phr | E24 phr | E25 phr | E26 phr |
| A3 | 100 | | | | | | | | | | | |
| B19 | | 100.1 | | | | | | | | | | |
| B20 | | | 100.5 | | | | | | | | | |

TABLE 7-continued

| | C3 phr | E16 phr | E17 phr | E18 phr | E19 phr | E20 phr | E21 phr | E22 phr | E23 phr | E24 phr | E25 phr | E26 phr |
|---|---|---|---|---|---|---|---|---|---|---|---|---|
| | | | | | | | | Compound | | | | |
| B21 | | | | 101 | | | | | | | | |
| B22 | | | | | 102 | | | | | | | |
| B23 | | | | | | 105.3 | | | | | | |
| B24 | | | | | | | 100.1 | | | | | |
| B25 | | | | | | | | 100.5 | | | | |
| B26 | | | | | | | | | 101 | | | |
| B27 | | | | | | | | | | 102 | | |
| B28 | | | | | | | | | | | 105.3 | |
| B29 | | | | | | | | | | | | 111.1 |
| Peroxide | 2 | 2 | 2 | 2 | 2 | 2 | 2 | 2 | 2 | 2 | 2 | 2 |
| Coagent | 5 | 5 | 5 | 5 | 5 | 5 | 5 | 5 | 5 | 5 | 5 | 5 |
| Antioxidant | 1 | 1 | 1 | 1 | 1 | 1 | 1 | 1 | 1 | 1 | 1 | 1 |
| Carbon black | 30 | 30 | 30 | 30 | 30 | 30 | 30 | 30 | 30 | 30 | 30 | 30 |
| | | | | | | Polyamide content | | | | | | |
| wt % | 0 | 0.1 | 0.5 | 1 | 2 | 5 | 0.1 | 0.5 | 1 | 2 | 5 | 10 |
| | | | | | | MDR cure response | | | | | | |
| ML (dN-m) | 0.2 | 0.2 | 0.2 | 0.2 | 0.2 | 0.2 | 0.2 | 0.2 | 0.2 | 0.2 | 0.3 | 0.3 |
| MH (dN-m) | 13 | 13 | 12.8 | 12.7 | 13 | 13.6 | 12.1 | 12.1 | 12.2 | 12.5 | 13.1 | 14.1 |
| MH-ML (dN-m) | 12.8 | 12.8 | 12.6 | 12.5 | 12.8 | 13.4 | 11.9 | 11.9 | 12 | 12.3 | 12.8 | 13.8 |
| | | | Shore A hardness and tensile properties after press cure and post cure | | | | | | | | | |
| Shore A (pts) | 68 | 68 | 70 | 68 | 70 | 70 | 70 | 68 | 69 | 70 | 71 | 74 |
| Tb (MPa) | 16.4 | 16.6 | 16.7 | 17.3 | 17.6 | 17.2 | 16 | 16.3 | 16.1 | 16.1 | 17.2 | 17.7 |
| Eb (%) | 225 | 245 | 235 | 195 | 245 | 215 | 230 | 200 | 225 | 235 | 215 | 210 |
| | | | | | | Compression Set, 70 hours at 150° C. | | | | | | |
| % | 12 | 16 | 14 | 11 | 10 | 11 | 14 | 13 | 14 | 14 | 14 | 18 |
| | | | Shore A hardness and tensile properties after one week hot air aging at 175° C. | | | | | | | | | |
| Shore A (pts) | 65 | 65 | 66 | 64 | 71 | 64 | 70 | 71 | 69 | 70 | 70 | 75 |
| Tb (MPa) | 3.8 | 2.8 | 7.9 | 11.6 | 13 | 13.3 | 10.1 | 12.5 | 11.9 | 13.3 | 13.6 | 14.7 |
| Eb (%) | 60 | 35 | 160 | 215 | 250 | 225 | 230 | 265 | 225 | 245 | 220 | 230 |
| | | | Shore A hardness and tensile properties after two weeks hot air aging at 175° C. | | | | | | | | | |
| Shore A (pts) | 85 | nm | nm | 73 | 66 | 71 | 75 | 69 | 69 | 72 | 71 | 73 |
| Tb (MPa) | * | nm | nm | 3.4 | 4.8 | 7.9 | 4.7 | 4.3 | 6.2 | 8.8 | 10.1 | 12.3 |
| Eb (%) | * | nm | nm | 20 | 40 | 100 | 35 | 60 | 105 | 145 | 160 | 195 |

Test results in Table 7 show that the comparative compound C3 and inventive compounds E16 through E26 exhibit good cure response, and similar initial Shore A hardness, tensile properties, and compression set resistance. After one week heat aging at 175° C., however, the inventive compounds comprising 0.5 wt % to 5 wt % polyamide P3 (i.e., E16-E20) exhibit good tensile strength and elongation, whereas compound C2 shows significant loss of properties. After one week heat aging at 175° C., all the inventive compounds comprising polyamide P4 (i.e., E21-E26, comprising 0.1 wt % to 10 wt % P4) exhibit good tensile strength and elongation. After two weeks hot air aging at 175° C., compound E20 comprising 5% polyamide P3 still retains 100% elongation to break, and compounds E23-E26 comprising 1% to 10% polyamide P4 still exhibit greater than 100% elongation to break. The comparative compound C3 is too brittle to test for tensile properties after two weeks at 175° C., and exhibits a 17 point Shore A hardness increase.

Example 3

EVA copolymer-polyamide blends B30 through B33 were prepared by mixing EVA copolymer A4 or A5 with polyamide P1 or P2 in the ratios shown in Table 3. These EVA copolymer-polyamide blends were prepared as described for blends B1 through B10 in Example 1.

TABLE 8

| | B30 % | B31 % | B32 % | B33 % |
|---|---|---|---|---|
| | | Blend | | |
| A4 | 95.24 | 95.24 | | |
| A5 | | | 95.24 | 95.24 |
| P1 | 4.76 | | 4.76 | |
| P2 | | 4.76 | | 4.76 |
| | | Mixer set temperature | | |
| deg C. | 130 | 170 | 130 | 170 |
| | | Mooney Viscosity | | |
| MU | 19 | 19 | 26 | 24 |

Blends B30 through B33 and EVA copolymers A4 and A5 were compounded to produce curable compounds C4, C5, and E27 through E30 as shown in Table 9. The compounding procedure used a Brabender Plasti-Corder® equipped with a Prep-Mixer® mixing bowl fitted with cam blades, followed by a final mixing and sheeting on a roll mill at a temperature of about 50° C. In the mixing bowl, the maximum batch temperature was about 100° C.

TABLE 9

| | Compound | | | | | |
|---|---|---|---|---|---|---|
| | C4 phr | C5 phr | E27 phr | E28 phr | E29 phr | E30 phr |
| A4 | 100 | | | | | |
| A5 | | 100 | | | | |
| B30 | | | 105 | | | |
| B31 | | | | 105 | | |
| B32 | | | | | 105 | |
| B33 | | | | | | 105 |
| Peroxide | 2 | 2 | 2 | 2 | 2 | 2 |
| Coagent | 5 | 5 | 5 | 5 | 5 | 5 |
| Antioxidant | 1 | 1 | 1 | 1 | 1 | 1 |
| Carbon black | 30 | 30 | 30 | 30 | 30 | 30 |
| Polyamide content | | | | | | |
| wt % | 0 | 0 | 4.76 | 4.76 | 4.76 | 4.76 |
| MDR cure response | | | | | | |
| ML (dN-m) | 0.3 | 0.4 | 0.3 | 0.3 | 0.4 | 0.3 |
| MH (dN-m) | 18.3 | 15.5 | 16.1 | 16.3 | 13.2 | 13.4 |
| MH-ML (dN-m) | 18.0 | 15.1 | 15.8 | 16.0 | 12.8 | 13.1 |
| Shore A hardness and tensile properties after press cure and post cure | | | | | | |
| Shore A (pts) | 87 | 91 | 85 | 85 | 91 | 93 |
| Tb (MPa) | 24.0 | 23.6 | 23.4 | 24.3 | 24.9 | 23.7 |
| Eb (%) | 225 | 215 | 235 | 255 | 270 | 230 |
| Compression Set, 70 hours at 150° C. | | | | | | |
| % | 12 | 11 | 13 | 20 | 11 | 17 |
| Shore A hardness and tensile properties after one week hot air aging at 175° C. | | | | | | |
| Shore A (pts) | 83 | 91 | 87 | 86 | 93 | 91 |
| Tb (MPa) | 3.9 | 6.0 | 19.9 | 19.4 | 20.6 | 20.3 |
| Eb (%) | 15 | 15 | 250 | 240 | 225 | 230 |

The test results in Table 9 show that the comparative and inventive compounds based on EVA copolymer A4 (C4 and E27, E28 respectively) exhibit good cure response and similar initial Shore A hardness and tensile properties. The comparative and invention compounds based on EVA copolymer A5 (C5 and E29, E30 respectively) also exhibit similarly good cure response and initial Shore A hardness and tensile properties. After hot air aging for one week at 175° C., however, comparative compounds C4 and C5 have lost at least 75% of their initial tensile strength and elongation, while inventive compounds E27 through E30, have lost only 20% or less of their initial tensile strength and elongation.

What is claimed is:

1. A heat resistant curable ethylene vinyl acetate (EVA) copolymer-polyamide blend composition comprising:
    (A) from about 99 wt % to about 95 wt % of an EVA component selected from the group consisting of
        (i) one or more amorphous EVA copolymers;
        (ii) one or more EVA copolymers having a melting peak temperature of 100° C. or less; and
        (iii) a combination of two or more of the amorphous EVA copolymers and the EVA copolymers having a melting peak temperature of 100° C. or less;
    (B) from about 1 wt % to about 5 wt % of one or more polyamides;
    wherein the weight percent of the polyamides and the EVA component are based on the total combined amount of EVA component and polyamides in the blend composition, the blend composition has a Mooney viscosity determined according to ASTM D1646, ML 1+4 at 100° C. less than 200, and the blend composition comprises polyamide particles dispersed in a continuous EVA copolymer matrix; and
    (C) a peroxide curative;
    wherein said curable composition, upon curing, forms a thermoset material.

2. The composition of claim 1 wherein the amorphous EVA copolymer or the EVA copolymer having a melting peak temperature of 100° C. or less comprises from about 18 wt % to about 90 wt % of vinyl acetate based on the weight of the EVA.

3. The composition of claim 1 wherein the EVA component has a Mooney viscosity determined according to ASTM D1646, ML 1+4 at 100° C. of less than 120.

4. The composition of claim 1 wherein each of the one or more polyamides has a melting peak temperature of less than about 270° C. as determined according to ASTM D3418-08.

5. The composition of claim 4 wherein each of the one or more polyamides has a melting peak temperature of less than 160° C.

6. The composition of claim 1 wherein at least one of said one or more polyamides is selected from nylon 6, nylon 6/6 or combinations thereof.

7. The composition of claim 1 wherein said composition has an increase in torque MH-ML of at least 2.5 dN-m when tested in a rotorless cure meter at conditions of 177° C. for 24 minutes per ASTM D5289-07a.

8. An article produced from the blend composition of claim 1.

9. The article of claim 8 wherein said article is wire or cable jacketing, spark plug boot, hose, belt, molded boot, seal, gasket, tubing, hose or grommet.

10. The composition of claim 1, further comprising one or more additives selected from the group consisting of fillers, plasticizers, pigments, antioxidants, process aids, waxes, and colorants.

11. The composition of claim 1, further comprising one or more polymers with amine or acid reactive functionality, or further comprising one or more elastomers.

12. A process for producing a heat resistant curable EVA copolymer-polyamide blend composition, wherein said curable composition, upon curing, forms a thermoset material; said curable composition comprising:
    (A) from about 99.9 wt % to about 90 wt % of an EVA component selected from the group consisting of
        (i) one or more amorphous EVA copolymers;
        (ii) one or more EVA copolymers having a melting peak temperature of 100° C. or less; and
        (iii) a combination of two or more of the amorphous EVA copolymers and the EVA copolymers having a melting peak temperature of 100° C. or less;
    (B) from about 0.1 wt % to about 10 wt % of one or more polyamides;
    wherein the weight percent of the polyamides and the EVA component are based on the total combined amount of EVA component and polyamides in the blend composition, the blend composition has a Mooney viscosity determined according to ASTM D1646, ML 1+4 at 100° C. less than 200, and the blend composition comprises polyamide particles dispersed in a continuous EVA copolymer matrix; and (C) a peroxide curative; and
said process comprising the steps of:
(A) providing said EVA component;
(B) providing said one or more polyamides, wherein each of the one or more polyamides has a melting peak temperature;
(C) mixing the EVA component and the one or more polyamides at a temperature that is:
(i) greater than the melting peak temperatures of the one or more polyamides; and
(ii) greater than the melting peak temperatures of the one or more EVA copolymers, when the EVA component comprises the one or more EVA copolymers having a melting peak temperature of 100° C. or less;
wherein said mixing disperses said one or more polyamides in said EVA component to form an EVA copolymer-polyamide blend composition;
(D) maintaining the temperature of the EVA copolymer-polyamide blend composition at less than 160° C., or cooling the EVA copolymer-polyamide blend composition to a temperature of less than 160° C.
wherein said temperature of less than 160° C. is below the decomposition temperature of the peroxide and below the temperature at which the crosslinking reaction occurs; and
(E) adding the peroxide curative to the EVA copolymer-polyamide blend composition at the temperature of less than 160° C. to form the heat resistant curable ethylene vinyl acetate (EVA) copolymer-polyamide blend composition.

13. The process of claim 12,
wherein the mixing of step (C) disperses the one or more polyamides in the EVA component to form an intermediate blend composition; said intermediate blend composition comprising about 0.1 to about 60 wt % of the one or more polyamides and about 40 to about 99.9 wt % of the EVA component; and
wherein the intermediate blend composition has a Mooney viscosity (ML1+4, 100° C.) according to ASTM D-1646 of less than 200; and
further comprising the step of:
mixing the intermediate blend composition with one or more additional EVA copolymers, said one or more additional EVA copolymers having melting peak temperatures of 100° C. or less, to form the EVA copolymer-polyamide blend composition.

14. The process of claim 13 in which the curable composition exhibits an increase in torque MH-ML of at least 2.5 dN-m when tested in a rotorless cure meter at conditions of 177° C. for 24 minutes per ASTM D5289-07a.

15. The process of claim 13, wherein the EVA component comprises said EVA copolymers having melting peak temperatures of 100° C. or less, and said one or more additional EVA copolymers are the same as the one or more EVA copolymers in the intermediate blend composition.

16. The process of claim 13, wherein the EVA component comprises said EVA copolymers having melting peak temperatures of 100° C. or less, and said one or more additional EVA copolymers are different from the one or more EVA copolymers in the intermediate blend composition.

17. The process of claim 12 in which the curable composition exhibits an increase in torque MH-ML of at least 2.5 dN-m when tested in a rotorless cure meter at conditions of 177° C. for 24 minutes per ASTM D5289-07a.

18. A process for producing a heat resistant curable EVA copolymer-polyamide blend composition, wherein said curable composition, upon curing, forms a thermoset material; said curable composition comprising:
(A) from about 99.9 wt % to about 90 wt % of an EVA component selected from the group consisting of
(i) one or more amorphous EVA copolymers;
(ii) one or more EVA copolymers having a melting peak temperature of 100° C. or less; and
(iii) a combination of two or more of the amorphous EVA copolymers and the EVA copolymers having a melting peak temperature of 100° C. or less;
(B) from about 0.1 wt % to about 10 wt % of one or more polyamides;
wherein the weight percent of the polyamides and the EVA component are based on the total combined amount of EVA component and polyamides in the blend composition, the blend composition has a Mooney viscosity determined according to ASTM D1646, ML 1+4 at 100° C. less than 200, and the blend composition comprises polyamide particles dispersed in a continuous EVA copolymer matrix; and
(C) a peroxide curative; and
said process comprising the steps of:
(A) providing the EVA component;
(B) providing the one or more polyamides, each of said one or more polyamides having a melting peak temperature that is less than 160° C.;
(C) providing the peroxide curative; and
(D) mixing the EVA component, the one or more polyamides, and the peroxide curative together at a temperature that is:
(i) less than or equal to 160° C.;
(ii) greater than the melting peak temperatures of the one or more polyamides;
(iii) greater than the melting peak temperatures of the one or more EVA copolymers, when the EVA component comprises the one or more EVA copolymers having a melting peak temperature of 100° C. or less; and
(iv) below the decomposition temperature of the peroxide and below the temperature at which the crosslinking reaction occurs;
wherein said mixing disperses the peroxide curative and the one or more polyamides in the EVA component and thereby produces the heat resistant curable EVA copolymer-polyamide blend composition.

19. The process of claim 18 in which the curable composition exhibits an increase in torque MH-ML of at least 2.5 dN-m when tested in a rotorless cure meter at conditions of 177° C. for 24 minutes per ASTM D5289-07a.

* * * * *